Aug. 28, 1934.  E. C. FURMAN ET AL  1,971,648
METHOD FOR SEALING LEAKS IN THREADED JOINTS
Filed Dec. 30, 1933   2 Sheets-Sheet 1
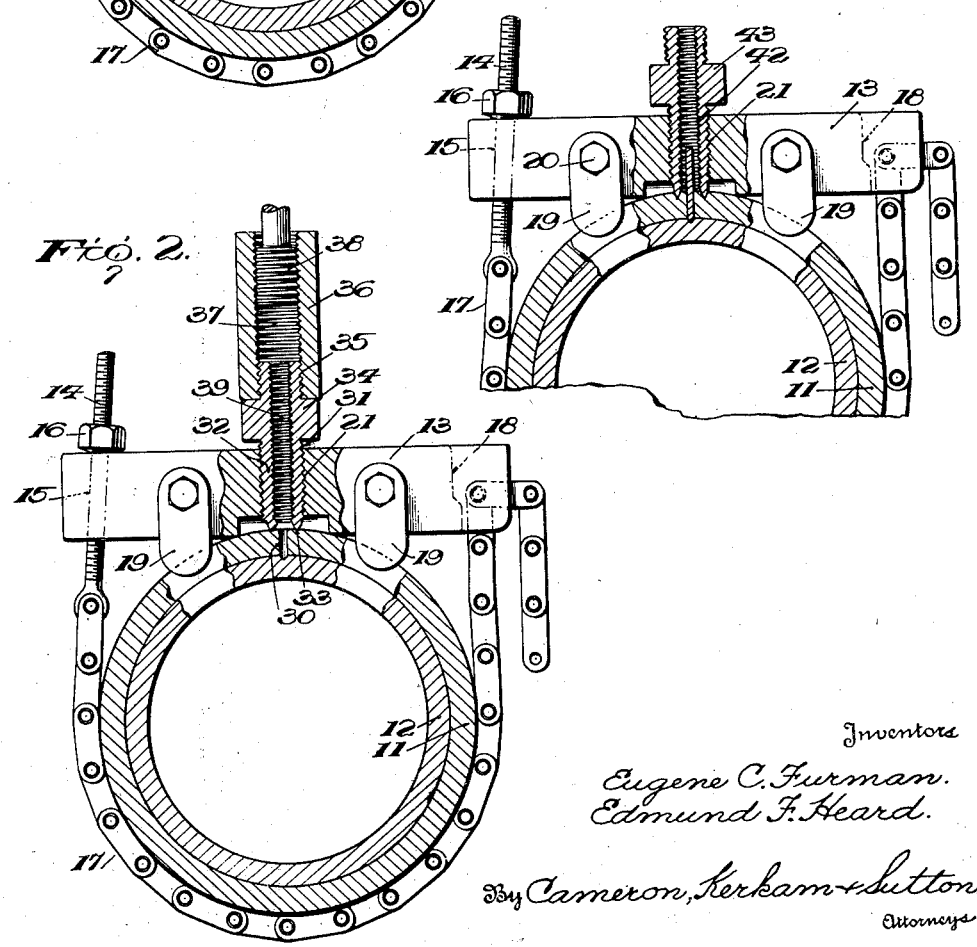
Inventors
Eugene C. Furman.
Edmund F. Heard.
By Cameron, Kerkam & Sutton.
Attorneys

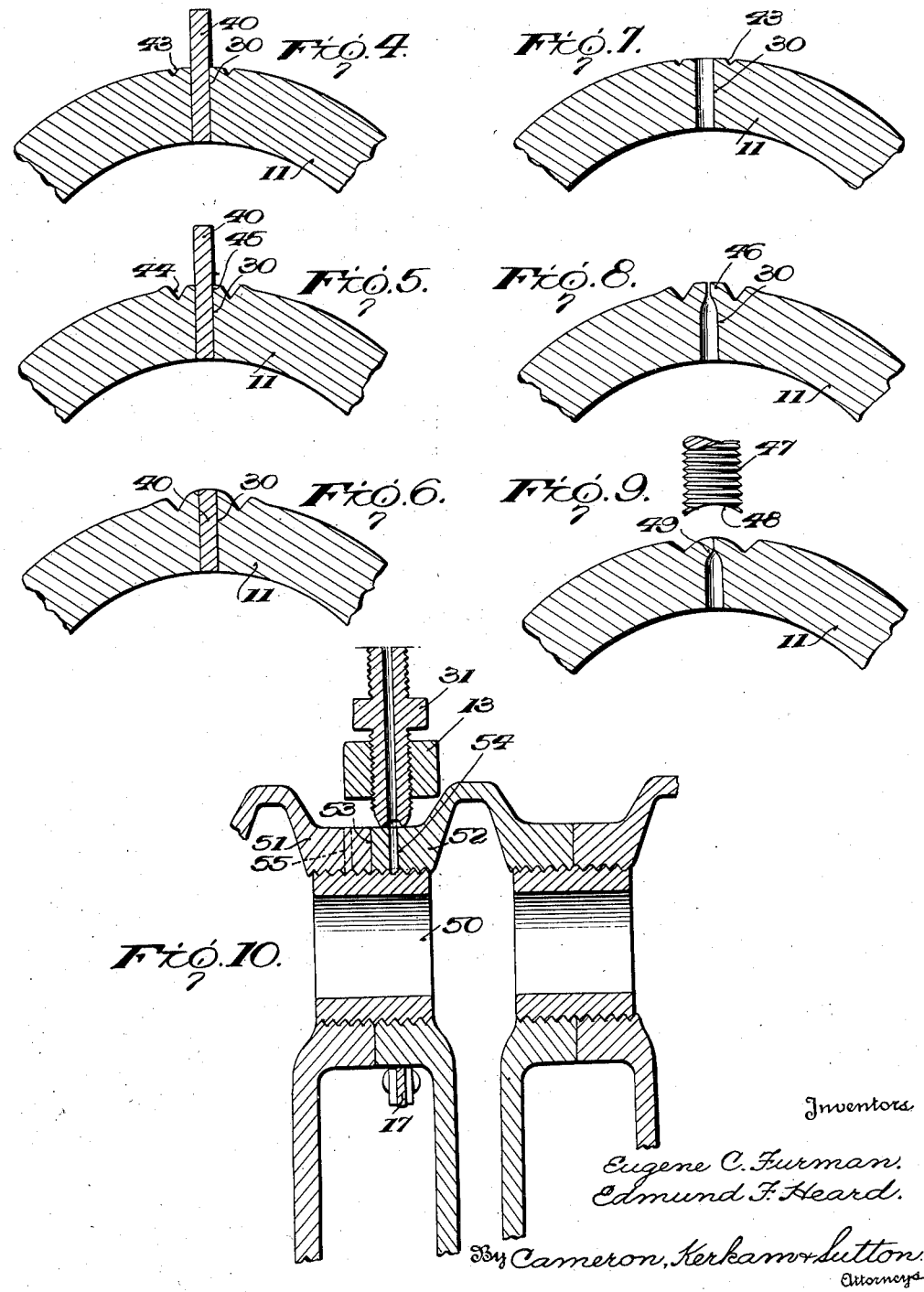

Patented Aug. 28, 1934

1,971,648

UNITED STATES PATENT OFFICE 1,971,648

METHOD FOR SEALING LEAKS IN THREADED JOINTS

Eugene C. Furman, Newport News, and Edmund F. Heard, Hampton, Va.

Application December 30, 1933, Serial No. 704,738

3 Claims. (Cl. 285—159)

This invention relates to a method, involving process and apparatus, for sealing leaks in threaded joints, and particularly to such a method which may be used while the joint is in service, and without changing the pressure on the joint or the positions of its parts, although if preferred the present invention may be utilized when the joint is not in service.

In our co-pending application Serial No. 670,778, filed May 12, 1933, and entitled Method of sealing leaks in threaded joints, we have disclosed and claimed a method whereby a threaded joint may be sealed to stop a leak therein while the joint is in service when one of the threaded elements has been preliminarily provided at a predetermined position, determinable from the exterior of the joint, and within the threaded area thereof, with a circumferential groove or groove section by drilling a hole in the exterior joint member until it intersects said groove or groove section, and then injecting through said hole and into said groove or groove section a fluid or semi-fluid sealing medium under a pressure in excess of that existing interiorly of the joint and sufficient in magnitude to cause the sealing medium to flow through and fill not only the groove or groove section but the communicating interthread spaces through which the leak is occurring, the sealing medium being such as to harden in place by chemical or thermal action and the pressure being retained on the same until the sealing medium has hardened in place.

Experience has demonstrated that this method of sealing leaks in threaded joints is effective in substantially all cases where one of the threaded elements of the joint is provided with the groove or groove section referred to, but there are already in service great numbers of threaded joints which have not been provided with the preliminary groove or groove section involved in said method, and it is obviously highly desirable to be able to seal leaks in threaded joints already in service and not provided with such a preliminary groove or groove section, and which sealing may be effected without dismantling the joint or even taking the interior pressure off of the joint.

We have discovered that a threaded joint not provided with a groove or groove section as involved in the method of our co-pending application can be sealed while in service and without changing the interior pressure acting thereon provided a hole is drilled or bored into the exterior member of the joint, opposite the mating threaded surfaces thereof, under such conditions, as hereinafter explained in detail, as will substantially prevent the formation of a burr around the hole at its opening into the threaded surface of the outer joint member and a sealing medium is then injected through said hole under such a pressure, as hereinafter explained in detail, as will cause said sealing medium to flow between the threaded surfaces, the sealing medium being retained under sufficient pressure to hold it between the threaded surfaces until it has hardened in place by thermal or chemical action as in our prior method.

It is therefore an object of the present invention to provide a method for sealing leaks in threaded joints which are not provided preliminarily with a groove or grooves section to facilitate distribution of the sealing medium, and which method may be used to seal leaks in threaded joints already in service without varying the pressure existing interiorly of the joint.

Another object of this invention is to provide a method of the character described which can be carried out with simple apparatus and without the need for highly skilled labor. Other objects will appear as the description of the invention proceeds.

The method of the present invention may be carried out by any suitable apparatus, but by preference it is performed by use of apparatus such as disclosed and claimed in our co-pending application Serial No. 704,741, filed of even date herewith and entitled Drilling and injecting apparatus.

The method of the present invention is exemplified in the accompanying drawings by illustration of the preferred apparatus to be used in carrying out the same and wherein the same reference characters are used to designate corresponding parts in the several figures.

Fig. 1 is an elevation, partly in section, of apparatus which is preferably used in performing the drilling operation to be described;

Fig. 2 is an elevation, partly in section, of the apparatus preferably used in injecting the sealing medium into the intersurface spaces of the threaded joint;

Fig. 3 is an elevation, partly in section, of the apparatus preferably used when the drilled hole is subsequently to be closed by a pin locked in position by deformation of the metal around the pin;

Figs. 4, 5 and 6 are schematic fragmentary views to illustrate the succeeding steps employed when the drilled hole is sealed by a pin locked in position by deformation of the metal;

Figs. 7, 8 and 9 are corresponding schematic fragmentary views to illustrate an alternative method for closing the drilled hole without the use of a pin; and Fig. 10 is a fragmentary elevation, partly in section, to illustrate the application of the present invention to one of the threaded joints between the sections of a radiator, the same being selected as typical of the application of the method to any one of a great number and variety of threaded joints with which the present invention may be used.

While the drawings illustrate a preferred apparatus to be employed, and such apparatus is hereinafter described with considerable detail in order to exemplify how the method may be carried out, it is to be expressly understood that the present invention is not restricted to use of the apparatus described but the method can be carried out by use of any suitable apparatus that will perform the operation defined.

Referring first to Figs. 1 and 2, 11 and 12 indicate the outer and inner members of a threaded joint of any suitable character, size, material and use and which have not been preliminarily provided with a groove or groove section as disclosed in our co-pending application Serial No. 670,778 above referred to—and which joint is to be sealed to stop a leak without withdrawing or varying the internal pressure normally existing on said joint while in service. In the first place, a small hole is drilled through the outer of the two members of the threaded joint until it reaches the mating threaded surfaces, this hole being bored at any conveniently accessible point opposite the area of contact of the threaded surfaces. Investigation has determined, however, that if a hole be formed by ordinary drilling operations the burr at the outlet end of the hole and therefore at the contacting threaded surfaces is ordinarily sufficient to prevent an injection of sealing medium through the hole and between the threaded surfaces to effectively stop the leak, said burr acting as a dam and the pressure on the sealing medium only serving to wedge the metal of the burr more effectively between the threaded surfaces so as to prevent flow and distribution of the sealing medium therebetween.

We have discovered, however, that if the hole be drilled under such conditions as to avoid the existence of the burr, sealing medium can be forced under pressure through the hole and between the threaded surfaces so as to effectively and efficiently seal the leak, as now to be explained. Provided that the hole be so formed as to substantially avoid the raising of a burr, this hole may be formed in any suitable way and by any suitable apparatus. We have found from experience that it is very important that an extremely sharp drill be used and that the drill be operated with a very light feed pressure to advance it into the metal of the outer joint member, so that only an extremely thin shaving is cut out by the cutting edges of the drill. In order to reduce the length of time required to drill such a hole at a low rate of feed, we prefer to use a high speed electric drill, operating for example on the order of 3000 R. P. M. for a $\frac{1}{16}$" diameter drill, the drill being made of high speed steel so as to prevent drawing of its temper under the heat of friction generated by the high speed of rotation. The drill should be withdrawn from the hole several times during the drilling operation so as to clean both the hole and the drill of metal cuttings, as their presence tends to increase the tendency for a burr to form. Furthermore, just before the drill breaks through the threaded surface, it should be withdrawn and the hole and drill thoroughly cleaned of chips, as by the use of compressed air or other suitable means. Care must also be taken to assure that the peripheral cutting edge of the drill as well as the point of the drill passes through the threaded surface, even though this involves the point of the drill passing to a slight distance into the inner joint member.

Experience has demonstrated that if the hole is drilled in the manner just described the formation of a burr is prevented in the great majority of cases. In the few cases in which notwithstanding such precautions a burr may be formed the burr may be removed by use of a light reaming operation, but if preferred this reaming operation may be used as a measure of precaution in all cases. The reaming operation is performed by a slightly larger drill, say one having a diameter four thousandths of an inch greater than that used in the first drilling operation, and this reaming drill must also be very sharp, and it should be fed into the metal very slowly so as to remove only minute shavings from the walls of the hole. As in the case of the first drilling operation care must be exercised to clean both the hole and drill of shavings, particularly just prior to the time when the reaming drill reaches the mating threaded surfaces. In the reaming operation it is also especially important that at the time when the drill is about to reach the mating threaded surfaces it be advanced or fed longitudinally at a very low rate of speed. Under such circumstances experience has shown that the tendency of a burr to form at the end of the hole is reduced to a minimum and if any burr is formed its character is not such as to materially interfere with the subsequent distribution of the sealing medium.

Fig. 1 illustrates a preferred apparatus for performing this drilling operation. As here shown a clamp bar 13 is tightly secured to the periphery of the outer threaded element of the joint. Any suitable means may be employed for securing said clamp bar 13 in position, said means preferably being adjustable so that it can be employed with joints of different shapes and diameters. As shown, the clamp bar has adjustably attached to one end thereof, as by a threaded stem 14 passing through an aperture 15 in said bar and carrying an adjustable nut 16 designed to engage the surface of the bar 13, a chain 17 which at its opposite end may be engaged and locked in a recess 18. As shown said clamp bar also carries a pair of depending plates 19 secured to the bar by bolts or screws 20 and which may engage the end of the outer element of the threaded joint so as to locate the hole to be drilled at a predetermined distance from the end of the threaded joint. Locating plates 19, however, may be omitted where unnecessary or undesirable.

The inner face of bar 13 is recessed as shown at 20 so as to provide an opening by which the escape of fluid through the drilled hole may be visibly detected as evidence that the drill has reached the threaded surfaces, and passing through the bar and into said recess 20 is a threaded aperture 21 which is adapted to receive an exteriorly threaded jig and chuck-guide 22 for the drill holder 23. Member 22 is provided at its outer end with a flange 24 by which it may be threaded into the aperture 21 so as to cause the inner end 25 thereof to firmly engage with the exterior periphery of the joint member 11. The member 22 has a cylindrical bore conforming with the exterior diameter of the drill holder 23, so as to constitute a guide for the latter, while its inner closed end is provided with an aperture 26 corresponding in size with the diameter of the drill to be used, which is preferably on the order of $\frac{1}{16}''$. The drill 27 is secured in the drill holder 23 in any suitable way, as by a set screw 28, and is operated by any suitable drilling mechanism, as an electric motor rotating at high speed as above referred to. The drill holder is also provided with an enlarged portion forming a shoulder 29 for engagement with the end of the member 22.

The drill is set in its holder so that shoulder 29 will engage member 22 when the drill has just passed through the outer threaded element, with its point slightly passing into the inner threaded element sufficiently to assure that the peripheral edge of the drill has passed through the threaded surface of the outer member. This location of the drill properly within its holder can be effected by engaging member 22 with the periphery of the outer joint member 11 at the end of the latter and, with the set screw 28 loosened, engaging the point of the drill firmly with the periphery of the inner joint member while shoulder 29 is in contact with the end of member 22. If the set screw is now tightened, the projection of the drill beyond its guide member 22 is such that when the shoulder 29 engages the end of said guide member the point of the drill will have broken through the inner threaded surface of the outer joint member.

The hole having been formed in the outer joint member in the manner above described, a reaming operation may then be performed where necessary, or desired as a matter of precaution, by using a guide member 22 having an appropriately larger guide opening 26 and employing a drill of slightly larger diameter as above described.

An injection device of any suitable character is then securely clamped to the outer member of the threaded joint. The injection device may have a relatively yieldable or deformable end to conform under pressure with the surface of the outer joint member, as disclosed in our application Serial No. 670,778 above referred to, or, as preferred, the injection device may have a hardened and sharpened edge portion as here illustrated so that it will bite into the metal of the outer joint member. As illustrated the injection device is one that can be used without removing or displacing the clamp bar 13 with respect to the joint. To this end the combined jig and chuck-guide 22 of the structure of Fig. 1 is removed from the threaded aperture 21, and in place thereof there is threaded into the aperture 21 an injection nozzle 31 having an exteriorly threaded shank 32 and, as here shown, a hardened and sharpened end surface 33 which will bite into the metal of member 11. Member 31 is provided with an enlarged portion 34 which may be engaged by a wrench so as to force the sharpened edge 33 into the metal of the member 11 with considerable pressure. The outer end of member 31 is threaded as shown at 35 and mounted thereon is the interiorly threaded cylinder 36 of the injection device, here schematically indicated as having a chamber 37 for the sealing medium and a threaded plunger 38 which may be operated in any suitable way to exert the necessary pressure on the sealing medium in the chamber 37 and force it through the bore 39 of the nozzle 31 into the aperture 30 and thence between the threaded surfaces of the members 11 and 12.

As before indicated, we have discovered that if a relatively high pressure, which will vary with the size, material, and accuracy of fit of the threaded members and the fluidity of the sealing medium, but which will ordinarily exceed one thousand pounds per square inch, is exerted on the sealing medium, the sealing medium is caused to flow between the threaded surfaces of the joint and become so distributed as to fill the intersurface spaces, particularly those which constitute the leak, that the leak is effectively sealed. The exact reason for this distribution of the sealing medium is not completely understood, and it may involve some elastic deformation of the threaded surfaces, but it is possibly due entirely to the fact that some space always exists between the threaded surfaces so that if sufficient pressure is exerted on the sealing medium to overcome the frictional resistance to flow, the proper distribution of the sealing medium will be effected.

In any event the pressure on the sealing medium is in excess of that existing interiorly of the threaded joint so that the interior pressure does not prevent the proper distribution of the sealing medium, and this pressure is maintained on the sealing medium until it hardens in place. Any suitable sealing medium of a fluid or semi-fluid character may be employed, provided it is one that will harden in place under thermal or chemical action.

The sealing medium fills the hole 30 and effectively plugs the same. If preferred, however, the sealing medium may be suitably removed from the aperture 30 and said aperture metallically sealed so that the joint may be subsequently dismantled and reassembled without danger of a leak occurring at said aperture. For example, the aperture may be tapped and a plug threaded thereinto, but I prefer to follow one of the procedures illustrated in Figs. 3 to 9.

Referring first to Figs. 4, 5 and 6, the sealing medium may be removed from the aperture 30 and a pin 40, which may be cylindrical or slightly tapered and which has a size corresponding with the size of said aperture 30, is driven into said aperture as shown in Fig. 4. To retain the pin 40 in said aperture the metal surrounding the aperture is then calked or distorted so as to tightly grip and lock the pin in said aperture, as by forcing a calking tool into the metal of the outer joint member 11 so as to deform and compress the metal around the aperture 30 and squeeze it into gripping contact with the pin 40, as shown in Fig. 5. The pin may then be cut off flush with the surface of the pipe, as shown in Fig. 6, and if desired the metal may be further peened or upset to assure that the pin is securely retained in the aperture against the dislodgment by pressure from the inside of the joint, or a rotary peening tool may be used as hereinafter explained.

An apparatus for calking the metal around the pin 40 is shown in Fig. 3, this apparatus utilizing the clamp bar 13 and chain 17 of the apparatus of Figs. 1 and 2 without need for removing or displacing the clamp bar with respect to the joint. As here illustrated the nozzle 31 of Fig. 2 is removed from the threaded aperture 21, and in its place is threaded a hollow calking tool 42 having an exteriorly threaded shank and a head 43 which may be manipulated by a wrench. If the nozzle 31 is of sufficient strength and has a properly hardened cutting end it may be used without substituting the calking tool 42. The calking tool 42, or the nozzle 31 when used, is forced into the metal by rotating it in the aperture 21, and by combined pressure and rotary action it forms a groove 44 as shown in Fig. 5 and compacts and displaces the metal around the pin at 45 to grip and lock said pin.

An alternative procedure which does not employ a pin, and which therefore does not require that the sealing medium be completely removed from the aperture 30, but only that it be removed from the outer end thereof, is illustrated in Figs. 7, 8 and 9. In Fig. 7 the member 11 is shown with the aperture 30 extending therethrough. A calking tool such as shown at 42 in Fig. 3, or the nozzle 31 itself when used for that purpose, is then forced into the metal as shown in Fig. 8 to displace the metal around the mouth of the hole 30, as shown at 46 in Fig. 8, so as to nearly or completely close said aperture. To complete the closure a peening element 47 may be threaded into the aperture 21, said element 47 being provided with a concave end 48 which will engage the metal 46 at the outer end of the hole 30 and by rotary action and compression effect a complete closure of the opening as shown at 49 in Fig. 9.

In place of rotary calking and peening tools as illustrated, hammer-operated calking and peening tools may be used with either procedure if preferred. The method of closing the aperture 30 as heretofore described in conjunction with Figs. 3 to 9 inclusive, is not claimed herein but is made the subject of a separate application filed of even date herewith, Serial No. 704,740, and entitled Method of sealing apertures.

Referring now to Fig. 10, the invention is further exemplified as applied to the sealing of a leak in a radiator, although it is to be expressly understood that the invention is adapted to seal leaks in threaded joints of any other suitable character. When leakage occurs in a radiator it is ordinarily necessary to cut off the steam or water, drain the heating medium out of the radiator, and remove the ferrules 50, provided with right and left-hand threads at their opposite ends, by which the sections of the radiator, as 51 and 52, Fig. 10, are tightly drawn together to form a joint at 53. This not only requires use of special wrenches, and generally the injury of the threads at the joint being dismantled, but frequently the threaded joints are so rusted that the ferrules have to be broken in order to separate the radiator sections.

As illustrated in Fig. 10, the present invention enables the leak to be sealed without removing the pressure from the radiator or disconnecting any of the parts. As here shown, an aperture 54 is drilled through the radiator section, in the manner heretofore described, so as to intersect the threaded surface at the ferrule. Said aperture may be formed at only one side of the joint 53, or if preferred, such an aperture may be drilled through each of the adjacent radiator sections, the second aperture being indicated in dotted lines at 55. A sealing medium is then forced through the aperture or apertures to seal the leak, and the sealing medium injected through the aperture 54 will not only fill the interthread spaces between the ferrule and radiator section but even penetrate to fill any intersurface spaces at the joint 53. If it is preferred not to rely on the sealing medium to seal the aperture or apertures 54 and 55, said aperture or apertures may then be closed in any of the manners heretofore described. Fig. 10 illustrates in section the clamp bar 13, the chain 17 and the injection nozzle 31 corresponding to the structure of Fig. 2 in position, showing how the apparatus heretofore described may be readily applied to the radiator section.

It will therefore be perceived that by the present invention a method has been provided whereby leaks occurring in threaded joints the elements of which have not been previously provided with a groove or groove section, as disclosed in our co-pending application above identified, may be effectively and efficiently sealed without removing or varying the pressure existing within the joint. It will also be perceived that the method is one that may be readily carried out by ordinary mechanics, requiring relatively simple apparatus and operations that involve no high degree of skill.

While the method of the present invention and a suitable apparatus that is preferably employed have been described with considerable particularity, it is to be expressly understood that the invention is susceptible to other embodiments than those described, as will now be apparent to those skilled in the art, and that any other suitable apparatus may be employed. Therefore the invention is not to be restricted to the precise procedure that has been described by way of exemplification or to apparatus selected to exemplify the invention, but reference is to be had to the appended claims for a definition of the limits of the invention.

What is claimed is:—

1. A method for sealing leaks in threaded joints which do not include an interior groove or groove section for distributing a sealing medium, said method including the steps of slowly drilling an opening from the surface of the external member of the joint to the threaded surfaces and cleaning said opening of chips before it intersects the inner surface of the external member so as to avoid forming a substantial burr around said opening at said threaded surfaces, introducing through said opening and into the interthread spaces a sealing material under greater pressure than that existing in the interior of the joint and sufficient to force said sealing medium between the threaded surfaces, and retaining the pressure on said material until it hardens in the interthread spaces.

2. A method for sealing leaks in threaded joints which are not provided with an interior groove or groove section for distributing a sealing medium, said method including the steps of drilling at a relatively high rotary speed and a relatively slow axial feed a hole from the surface of the external member of the joint to the threaded surfaces thereof so as to avoid the formation of a substantial burr around said opening at said threaded surfaces, introducing through said hole a sealing medium under greater pressure than that existing in the interior of the joint and under a pressure sufficient to force the sealing medium between the threaded surfaces, and retaining the pressure on said medium until it hardens in the interthread spaces.

3. A method for sealing leaks in threaded joints which do not include an interior groove or groove section for distributing a sealing medium, said method including the steps of drilling at high rotary speed and slow axial feed an opening from the surface of the external member of the joint to the threaded surfaces, reaming said opening with a tool of slightly larger diameter than said opening so as to avoid the formation of a substantial burr around said opening at said threaded surfaces and leave a substantially unobstructed communication between said opening and the threaded surfaces, introducing through said opening and into the interthread spaces a sealing material under greater pressure than that existing in the interior of the joint and sufficient to distribute said sealing medium between the threaded surfaces, and retaining the pressure on said material until it hardens in the interthread spaces.

EUGENE C. FURMAN.
EDMUND F. HEARD.